*(12)* United States Patent
Opperthauser (10) Patent No.: US 7,793,893 B2
(45) Date of Patent: *Sep. 14, 2010

(54) CLEVIS HANGER ASSEMBLY AND PIPE INSULATION COUPLING

(76) Inventor: Orval A. Opperthauser, 404 Glenbrook, Atlantis, FL (US) 33462

( * ) Notice: Subject to any disclaimer, the term of this patent is extended or adjusted under 35 U.S.C. 154(b) by 0 days.

This patent is subject to a terminal disclaimer.

(21) Appl. No.: 11/374,671

(22) Filed: Mar. 14, 2006

(65) Prior Publication Data

US 2006/0175471 A1 Aug. 10, 2006

Related U.S. Application Data

(62) Division of application No. 10/413,129, filed on Apr. 14, 2003, now Pat. No. 7,207,527.

(51) Int. Cl.
*F16L 3/00* (2006.01)
*E21F 17/02* (2006.01)

(52) U.S. Cl. .............. 248/62; 248/55; 248/58; 248/65; 248/73

(58) Field of Classification Search .......... 248/57, 248/58, 62, 74.1, 74.2, 74.3, 55, 605, 604, 248/560, 580, 609, 610, 614; 24/459
See application file for complete search history.

(56) References Cited

U.S. PATENT DOCUMENTS

| 1,645,762 | A | * | 10/1927 | Lohbiller | 248/55 |
|---|---|---|---|---|---|
| 2,140,441 | A | * | 12/1938 | Clark | 248/27.3 |
| 2,324,181 | A | | 7/1943 | Tulien | |
| 2,339,564 | A | | 1/1944 | Goldberg et al. | |
| 2,749,155 | A | * | 6/1956 | Kinghorn et al. | 285/5 |
| 3,122,346 | A | | 2/1964 | Seller | |
| 3,185,758 | A | | 5/1965 | Litz | |
| 3,244,388 | A | * | 4/1966 | Coffman | 248/62 |
| 3,415,474 | A | | 12/1968 | Kindorf | |
| 3,530,899 | A | | 9/1970 | Breeding | |
| 3,539,137 | A | | 11/1970 | March | |
| 3,809,350 | A | * | 5/1974 | Lane | 248/57 |
| 3,933,377 | A | | 1/1976 | Arrowood | |
| 4,146,203 | A | | 3/1979 | Williams | |
| 4,694,865 | A | * | 9/1987 | Tauschmann | 138/148 |
| 4,804,158 | A | | 2/1989 | Collins et al. | |
| 4,852,831 | A | | 8/1989 | Sandstrom | |
| 4,856,221 | A | * | 8/1989 | Thompson | 43/21.2 |
| 5,013,166 | A | * | 5/1991 | Domer | 384/220 |
| 5,192,039 | A | | 3/1993 | Williams | |
| 5,219,427 | A | | 6/1993 | Harris | |
| 5,702,076 | A | | 12/1997 | Humber | |
| 5,924,655 | A | | 7/1999 | Rinderer | |
| 6,105,216 | A | | 8/2000 | Opperthauser | |
| 6,126,119 | A | * | 10/2000 | Giangrasso | 248/58 |
| 6,224,025 | B1 | | 5/2001 | Alvarez | |

(Continued)

*Primary Examiner*—Amy J Sterling
(74) *Attorney, Agent, or Firm*—Clark Hill PLC (57) ABSTRACT

A clevis hanger assembly supports a pipe insulation coupling member along a support structure. The clevis hanger assembly includes an upper bracket adapted to be secured to the support structure. The upper bracket includes a base extending between spaced apart downwardly extending flanges. The clevis hanger assembly also includes a lower bracket having spaced apart upwardly extending flanges disposed alongside the spaced apart downwardly extending flanges. The lower bracket includes an arcuate segment extending between the spaced apart upwardly extending flanges and defines coupling slots for receiving the pipe insulation coupling member.

15 Claims, 6 Drawing Sheets

U.S. PATENT DOCUMENTS

| | | | |
|---|---|---|---|
| 6,402,119 B1 * | 6/2002 | Miska | 248/613 |
| 6,450,736 B1 * | 9/2002 | Eck et al. | 405/184.4 |
| 6,527,233 B2 | 3/2003 | Maurice | |
| 6,582,655 B2 | 6/2003 | Botsolas et al. | |
| 6,601,802 B1 | 8/2003 | Howe | |
| 6,726,161 B2 * | 4/2004 | Plump et al. | 248/205.1 |
| 2001/0008265 A1 * | 7/2001 | Hauer | 248/74.2 |

* cited by examiner

CLEVIS HANGER ASSEMBLY AND PIPE INSULATION COUPLING

RELATED APPLICATION

This application is a divisional application of U.S. patent application Ser. No. 10/413,129, filed on Apr. 14, 2003 now U.S. Pat. No. 7,207,527.

BACKGROUND OF THE INVENTION

1. Field of the Invention

This invention relates to a clevis hanger assembly for supporting a pipe along a support structure. More particularly, the invention relates to a clevis hanger assembly coupled with a pipe insulation coupling member to support a pipe, which is encased by pipe insulation tubing, along a support structure.

2. Description of Related Art

Conventional pipes are used to convey or transfer fluids in various industrial applications, such as sprinkler systems and heating and cooling systems. These pipes are typically encased in a cellular foam insulation tubing, which maintains the fluids within the pipes at a desired temperature. The pipe insulation tubing is commonly provided in predetermined lengths that are aligned end-to-end to cover an entire length of the pipe. It is desirable to interconnect adjacent ends of the pipe insulation tubing along the pipe to increase insulation efficiency of the pipe. The adjacent ends of the pipe insulation tubing may be interconnected by tape, adhesive, or straps. These means for interconnection are, however, susceptible to wear and tear over time. As an alternative, various pipe insulation coupling members have been introduced to provide a secure and long lasting end-to-end attachment of adjacent pipe insulation tubing along the pipe.

In a typical application, the insulated pipe, that is, the pipe encased by the pipe insulation tubing, is disposed along a support structure, such as a ceiling. The insulated pipe is commonly supported along the support structure by a plurality of spaced apart clevis hangers. Each clevis hanger typically includes an upper member mounted to the support structure, and a generally U-shaped lower member for supporting the insulated pipe. The shape of the U-shaped lower member complements that of an outer periphery of an insulated pipe, thereby allowing the U-shaped lower member to retain the insulated pipe therealong.

It remains, however, desirable to provide a clevis hanger assembly that includes a coupling provision for securely supporting a pipe insulation coupling member therealong, whereby the pipe insulation coupling member maintains adjacent ends of pipe insulation tubing in an end-to-end relationship along a pipe.

SUMMARY OF THE INVENTION

According to one aspect of the invention, a clevis hanger assembly supports a pipe insulation coupling member along a support structure. The clevis hanger assembly includes an upper bracket adapted to be secured to the support structure. The upper bracket includes a base extending between spaced apart downwardly extending flanges. The clevis hanger assembly also includes a lower bracket having spaced apart upwardly extending flanges disposed alongside the spaced apart downwardly extending flanges. The lower bracket includes an arcuate segment extending between the spaced apart upwardly extending flanges. The lower bracket also defines coupling slots for receiving and retaining the pipe insulation coupling member between the spaced apart upwardly extending flanges.

According to another aspect of the invention, a pipe insulation coupling member retains adjacent ends of elongated pipe insulation tubing around a pipe. The pipe insulation coupling member includes an elongated body extending along a longitudinal axis between a first end and a second end. The elongated body includes an outer tube wall extending between the first and second ends. A planar interior wall is located within the outer tube wall and positioned transverse to the longitudinal axis. The planar interior wall includes a center bore for receiving the pipe therethrough and defines opposing first and second outer channels for receiving the adjacent ends of the elongated pipe insulation tubing.

According to yet another aspect of the invention, a pipe support assembly secures a pipe and adjacent ends of pipe insulation tubing surrounding the pipe to a support structure. The pipe support assembly includes a clevis hanger assembly adapted to be secured to the support structure. The clevis hanger assembly includes an upper bracket having a base extending between spaced apart downwardly extending flanges. The clevis hanger assembly also includes a lower bracket including an arcuate segment extending between the spaced apart upwardly extending flanges, which are disposed alongside the spaced apart downwardly extending flanges. The lower bracket includes coupling slots formed therealong. The pipe support assembly also includes a pipe insulation coupling member for retaining the adjacent ends of the pipe insulation tubing around the pipe. The pipe insulation coupling member is disposed inside of the spaced apart downwardly and upwardly extending flanges and has an elongated body including a longitudinally extending arcuate outer tube wall. The outer tube wall includes outwardly protruding tabs therealong that are received within the coupling slots to retain and support the pipe insulation coupling member along the lower bracket of the clevis hanger assembly.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
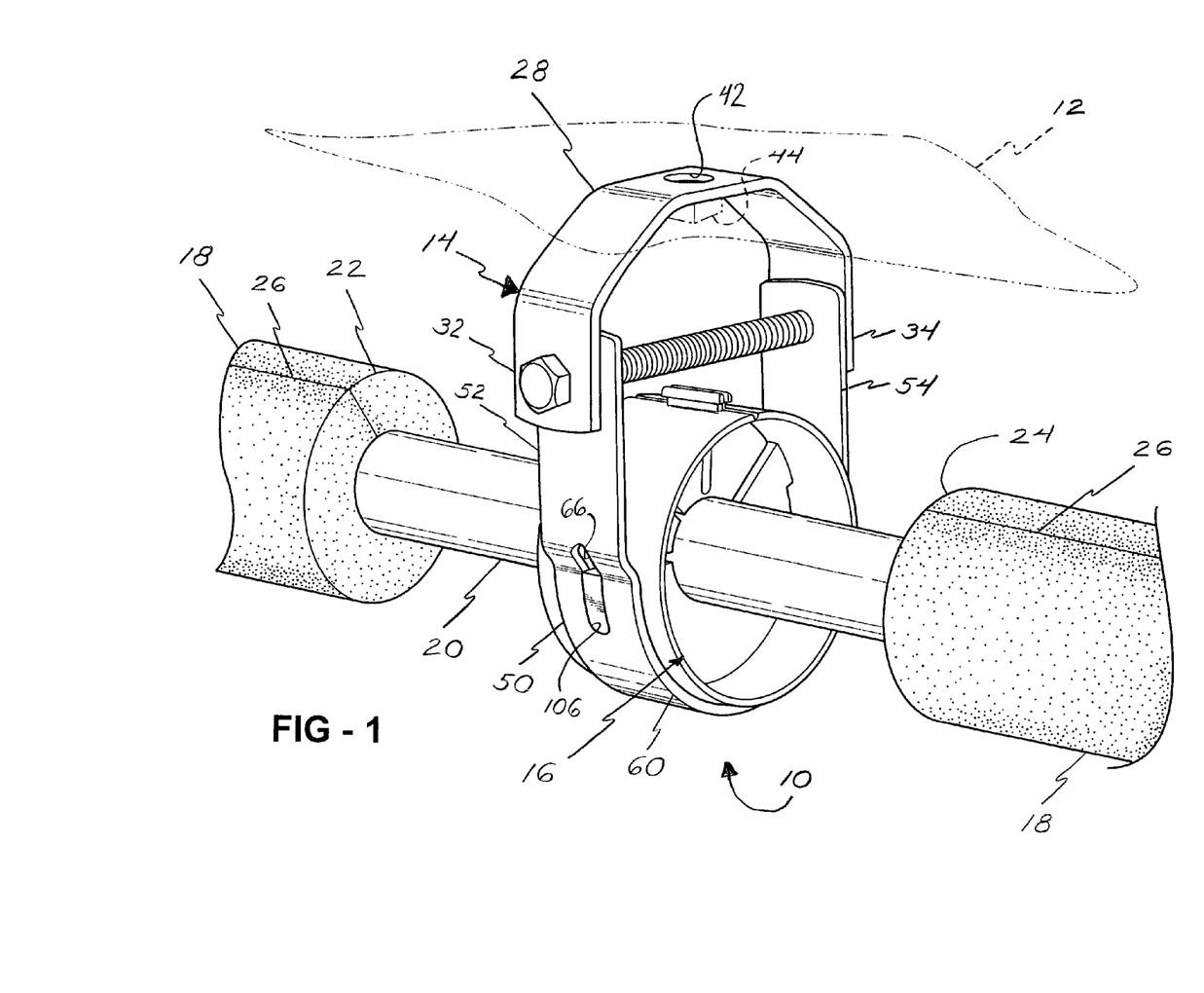
FIG. 1 is a perspective view of a pipe support assembly according to the invention including a clevis hanger assembly coupled with a pipe insulation coupling member, which supports adjacent ends of pipe insulation tubing along a pipe.

Referring to FIG. 1, a pipe support assembly, generally shown at 10, is mounted along a support structure 12. The support structure 12 is a generally planar surface, such as a ceiling. The pipe support assembly 10 includes a clevis hanger assembly, generally indicated at 14, mounted to the support structure 12 and supporting a pipe insulation coupling member 16. The pipe insulation coupling member 16 retains an elongated pipe insulation tubing 18 around an elongated tubular pipe 20, which transfers fluids therethrough. More specifically, the pipe insulation coupling member 16 retains adjacent ends 22, 24 of the pipe insulation tubing 18 against one another to ensure that an entire length of the pipe 20 remains insulated even as the pipe 20 is exposed to wear and tear. The pipe insulation tubing 18, which is commonly formed from cellular polyurethane foam, is provided in predetermined lengths and includes a longitudinal open slit 26 therealong that allows the pipe insulation tubing 18 to be wrapped around the pipe 20. The pipe 20 is commonly formed from aluminum or copper and is utilized for hydraulic pipes, pneumatic tubes, refrigeration lines, water pipes, and the like, as are typically known in the art. Both the pipe insulation tubing 18 and the pipe 20 extend along a longitudinal axis.

Figure 2:
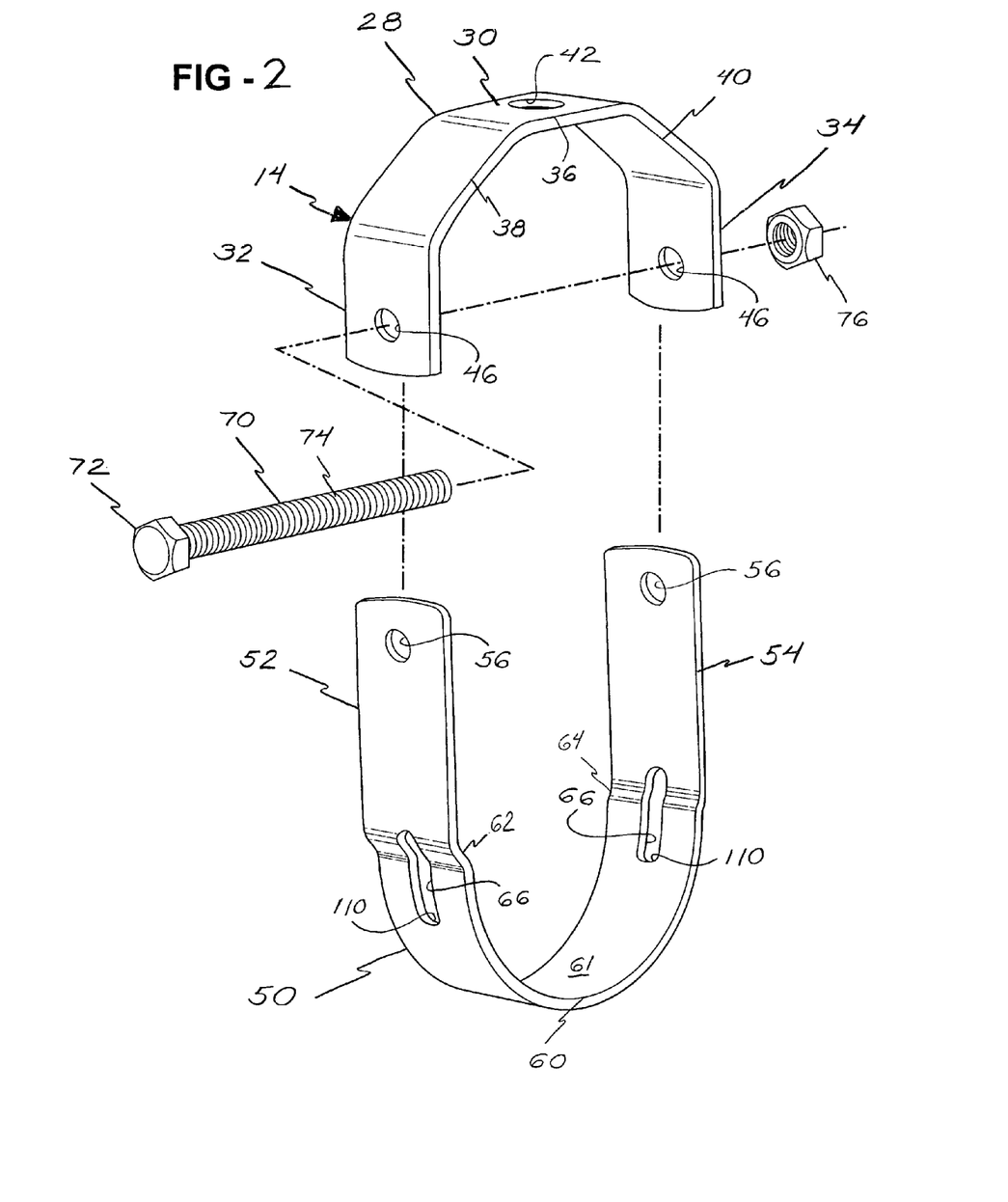
FIG. 2 is a perspective view of the clevis hanger assembly.
Figure 3:
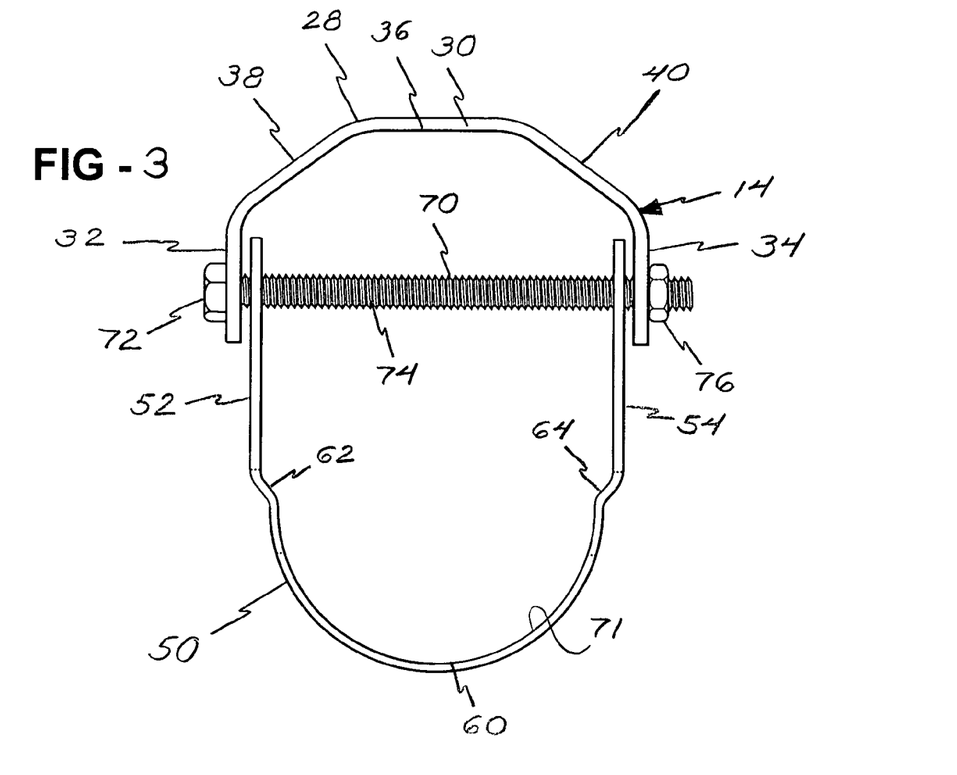
FIG. 3 is a front view of the clevis hanger assembly.
Figure 4:
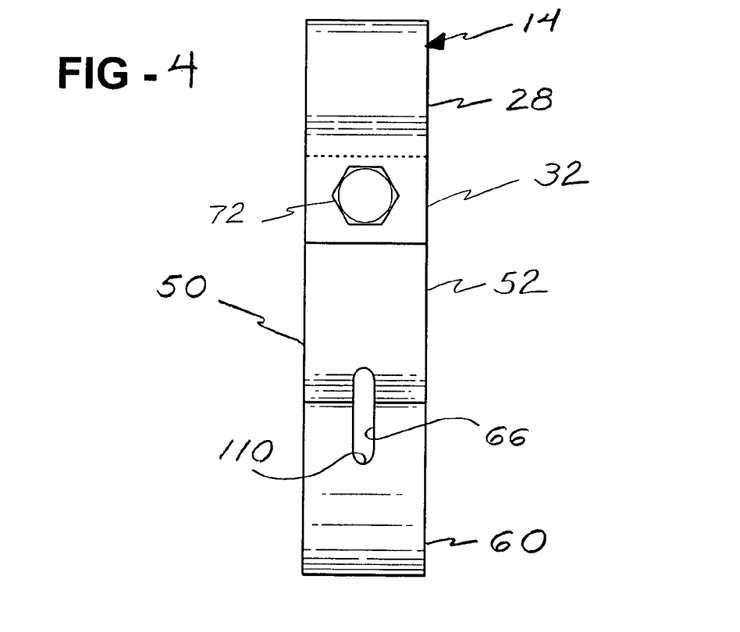
FIG. 4 is a side elevational view of the clevis hanger assembly.

Referring to FIGS. 2 through 4, the clevis hanger assembly 14 includes an upper bracket 28 having a base 30 extending between spaced apart downwardly extending flanges 32, 34. The base 30 defines a generally horizontal center segment 36 having a pair of depending arms 38, 40 extending therefrom at an angle. The center segment 36 includes a mounting aperture 42 extending therethrough. A bolt 44, shown in FIG. 1, extends through the mounting aperture 42 to secure the clevis hanger assembly 14 to the support structure 12. The depending arms 38, 40 allow for clearance between the upper bracket 28 and the support structure 12. Each of the spaced apart downwardly extending flanges 32, 34 includes a first receiving aperture 46, shown in FIG. 2.

The clevis hanger assembly 14 also includes a lower bracket 50 having spaced apart upwardly extending flanges 52, 54 disposed alongside the spaced apart downwardly extending flanges 32, 34. Each of the spaced apart upwardly extending flanges 52, 54 includes a second receiving aperture 56. The second receiving apertures 56 are axially aligned with the first receiving apertures 46 of the spaced apart downwardly extending flanges 32, 34. As shown in FIG. 3, the spaced apart upwardly extending flanges 52, 54 are positioned inside of the spaced apart downwardly extending flanges 32, 34. It is, however, contemplated that in the alternative the spaced apart downwardly extending flanges 32, 34 may be positioned inside of the spaced apart upwardly extending flanges 52, 54.

The lower bracket 50 also includes an arcuate segment 60 extending between the spaced apart upwardly extending flanges 52, 54 so that the lower bracket 50 has a U-shape. The arcuate segment 60 includes an inner surface 61 and outwardly flared ends 62, 64 extending between the arcuate segment 60 and the spaced apart upwardly extending flanges 52, 54.

The lower bracket 50 further includes elongated coupling slots 66 for receiving the pipe insulation coupling member 16, as described in further detail below. The coupling slots 66 are located where the arcuate segment 60 meets each of the spaced apart upwardly extending flanges 52, 54. In other words, the coupling slots 66 each extend along a portion of the respective spaced apart upwardly extending flanges 52, 54, along the respective outwardly flared ends 62, 64, and along a portion of the arcuate segment 60, as shown in FIG. 2.

An elongated fastener 70 extends transverse to the longitudinal axis and through the first 46 and second 56 receiving apertures of the respective spaced apart downwardly 32, 34 and upwardly 52, 54 extending flanges to secure the upper bracket 28 to the lower bracket 50. The fastener 70 and the lower bracket 50 define an opening 71, shown in FIG. 3, for receiving the pipe insulation coupling member 16. The fastener 70 includes a head 72 and a shank 74 extending therefrom. In a preferred embodiment, the shank 74 is threaded. The head 72 is disposed adjacent one of the spaced apart downwardly extending flanges 32, 34 of the upper bracket 28. A nut 76 is threaded onto the fastener 70 at an end opposite that of the head 72 to fixedly secure upper bracket 28 along the fastener 70. The spaced apart upwardly extending flanges 52, 54 are retained along the fastener 70 between the spaced apart downwardly extending flanges 32, 34 of the upper bracket 28 such that the lower bracket 50 is able to slide along the threaded shank 74 relative to the upper bracket 28 in a direction transverse to the longitudinal axis.

Figure 5:
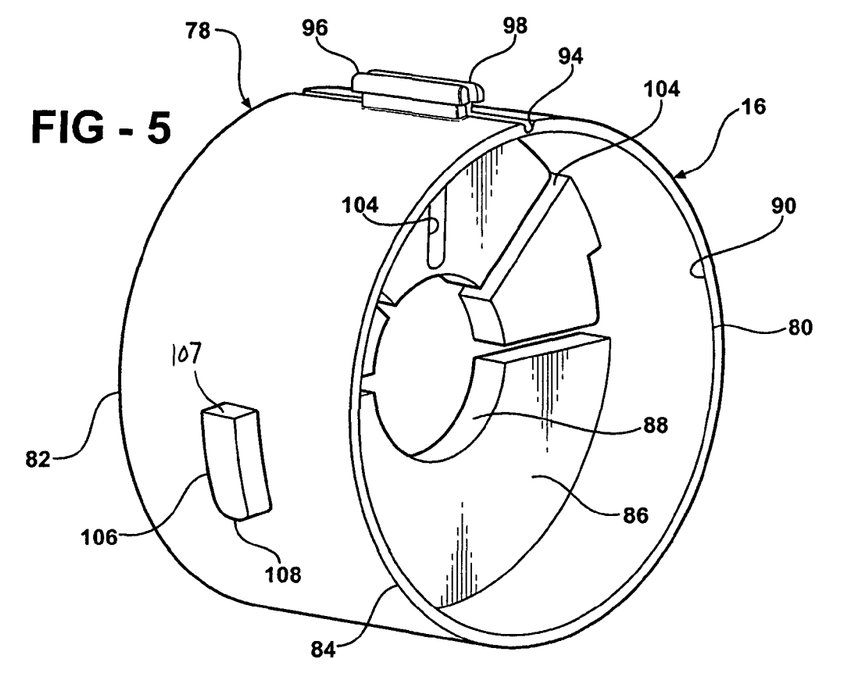
FIG. 5 is a perspective view of the pipe insulation coupling member.
Figure 6:
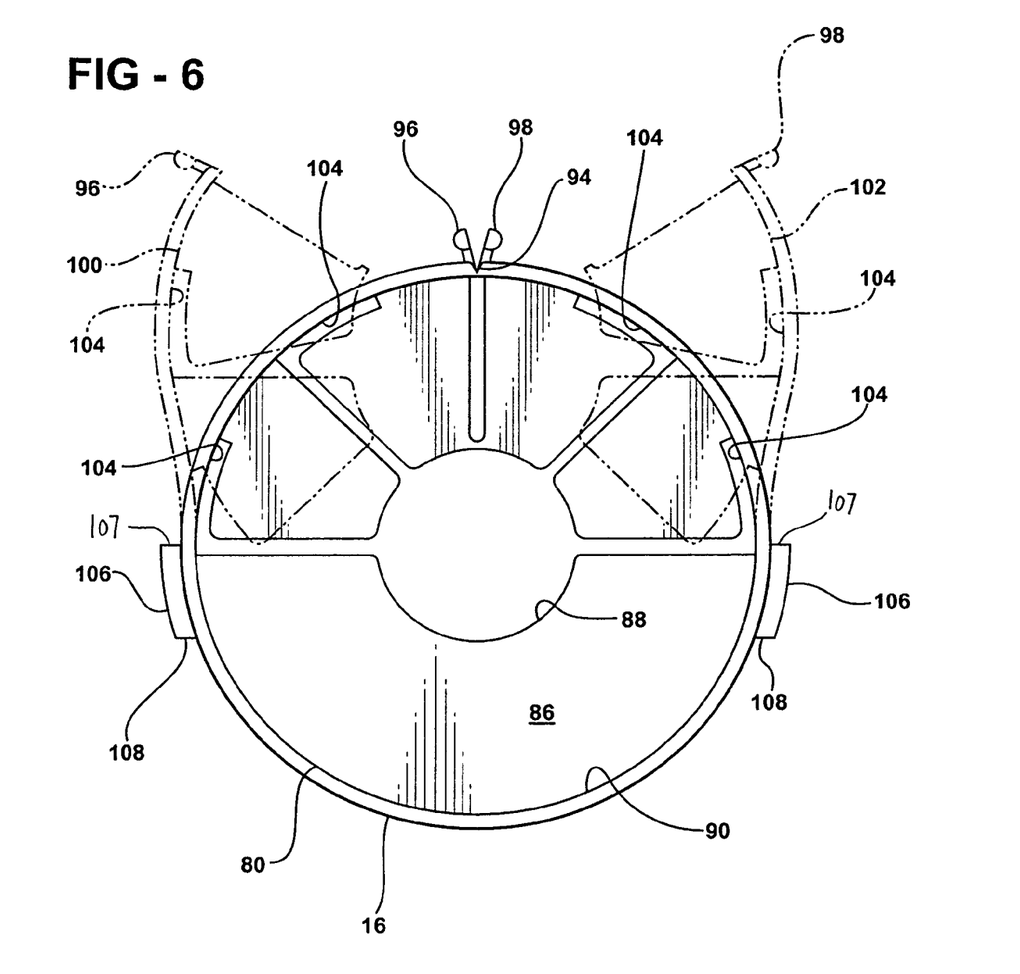
FIG. 6 is a front view of the pipe insulation coupling member having separable wedge sections.
Figure 7:
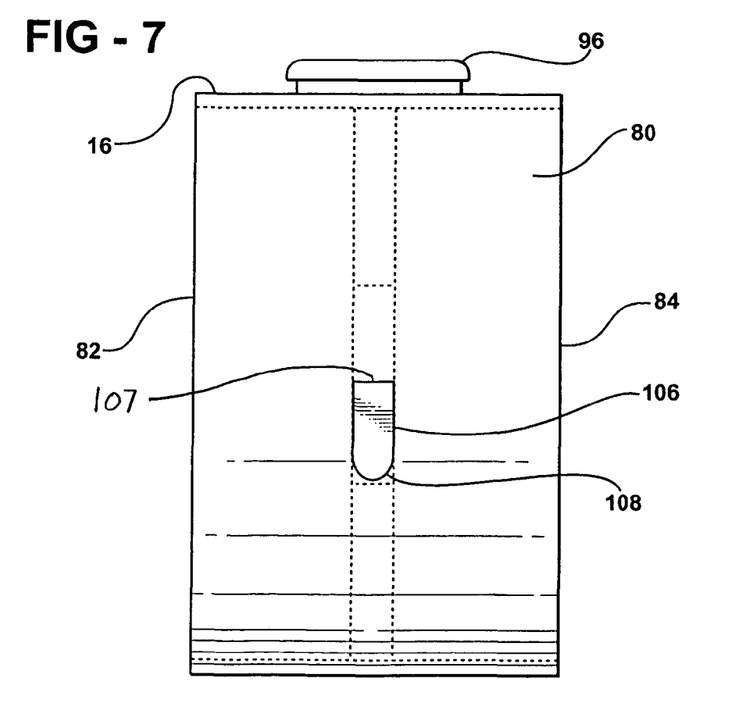
FIG. 7 is a side elevational view of the pipe insulation coupling member.

Referring to FIGS. 5 through 7, the pipe insulation coupling member 16 for coupling the adjacent ends 22, 24 of the pipe insulation tubing 18 along the pipe 20 includes a longitudinally extending elongated body, generally indicated at 78, having an arcuate outer tube wall 80 extending between first 82 and second 84 ends. The pipe insulation coupling member 16 is integrally formed from a plastic material.

A planar interior wall 86 is disposed within the outer tube wall 80 and extends transverse to the elongated body 78. The planar interior wall 86 includes a center bore 88 for receiving the pipe 20 therewithin, and defines opposing outer channels 90 (only one shown) for receiving the adjacent ends 22, 24 of the pipe insulation tubing 18. Referring to FIGS. 5 and 7, the planar interior wall 86 has a thickness T in the longitudinal direction. Each of the opposing outer channels 90 has a length L in the longitudinal direction. The length L of each opposing outer channel 90 is greater than the thickness T of the planar interior wall 86.

The outer tube wall 80 includes a longitudinally extending perforation 94 therealong. In the preferred embodiment, the perforation 94 is generally V-shaped. Opposing separation tabs 96, 98 are disposed alongside the perforation 94. The separation tabs 96, 98 are pulled away from each other to separate the elongated body 78 at the perforation 94 into first 100 and second 102 wedge-shaped sections, which are shown in dashed lines in FIG. 6. When the first 100 and second 102 wedge-shaped sections are separated, the center bore 88 is able to receive the pipe 18 therewithin. The planar interior wall 86 defines a plurality of slits 104 therethrough to promote the separation of the elongated body 78 into the first 100 and second 102 wedge-shaped sections. In the preferred embodiment, the plurality of slits 104 is generally L-shaped.

Figure 8:
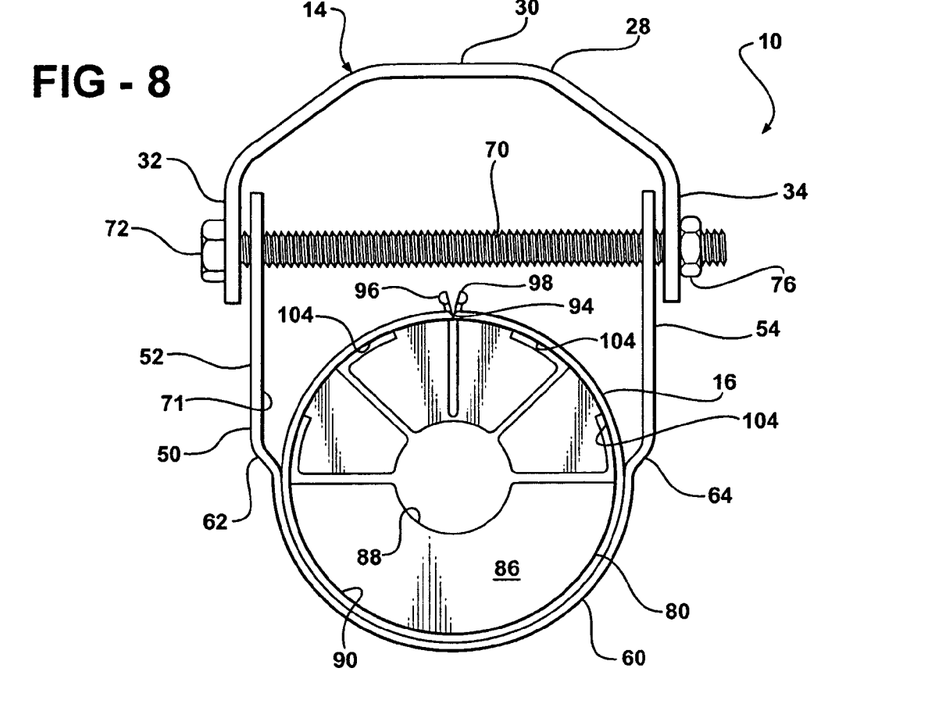
FIG. 8 is a front view of the clevis hanger assembly coupled with the pipe insulation coupling member.
Figure 9:
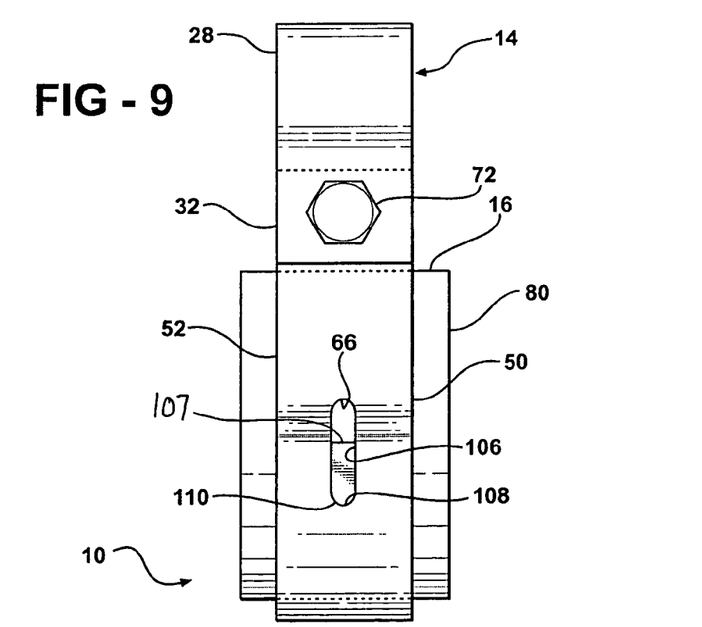
FIG. 9 is a side view of the clevis hanger assembly coupled with the pipe insulation coupling member.

The outer tube wall 80 also includes elongated outwardly protruding tabs 106 extending out therefrom. In the embodiment shown, the outwardly protruding tabs 106 are disposed generally midway between the first 82 and second 84 ends of the outer tube wall 80. Referring to FIGS. 8 and 9, the pipe insulation coupling member 16 is housed within the opening 71 of the clevis hanger assembly 14. The outwardly protruding tabs 106 of the pipe insulation coupling member 16 are shaped to fit within the coupling slots 66 along the lower bracket 50 of the clevis hanger assembly 14 to retain the pipe insulation coupling member 16 within the opening 71 of the clevis hanger assembly 14. The outwardly protruding tabs 106 extend circumferentially a portion of the circumference of the outer tube wall 80 between an upper portion 107 and a lower portion 108. The lower portion 108 of each of the outwardly protruding tabs 106 has a shape complementary to that of a lower end 110 of each of the coupling slots 66. As a result, when the outwardly protruding tabs 106 are received within the coupling slots 66, the lower portion 108 of each of the outwardly protruding tabs 106 will rest comfortably along the lower end 108 of each of the coupling slots 66. In addition, when the outwardly protruding tabs 106 are received within the coupling slots 66, a portion of the outer tube wall 80 abuts the inner surface 61 of the arcuate segment 60 so that the pipe insulation coupling member 16 is supported by the lower bracket 50 of the clevis hanger assembly 14.

More specifically, the flared ends 62, 64 extending between the spaced apart upwardly extending flanges 52, 54 and the arcuate segment 60 reduce the distance between the spaced apart upwardly extending flanges 52, 54 and thus the diameter of the arcuate segment 60 as necessary to mate with the arcuate diameter and shape of the outer tube wall 80. Therefore, the flared ends 62, 64 may be tailored to adjust the diameter of the arcuate segment 60 to match the diameter of a variety of pipe insulation coupling members 16.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A pipe insulation coupling member for retaining adjacent ends of elongated pipe insulation tubing around a pipe, said pipe insulation coupling member comprising:
an integrally molded, one piece elongated body extending along a longitudinal axis between a first end and a second end and including first and second wedge-shaped sections, said elongated body including an outer tubular wall extending between said first and second ends and including a longitudinally extending perforation whereat said first wedge-shaped section is separated from said second wedge-shaped section wherein said coupling member is resiliently flexed from a closed position for surrounding and supporting the pipe to an open position providing a space between said first and second wedge-shaped sections for receiving the pipe therebetween, said outer tubular wall including outwardly protruding tabs generally midway between said first and second ends thereof, and a planar interior wall fixedly secured to said outer tubular wall generally midway between said first and second ends and extending inwardly from said outer tubular wall transverse to said longitudinal axis, said planar interior wall including a center bore for receiving the pipe therethrough and defining opposing first and second outer channels extending from said planar interior wall to said respective one of said first and second ends for receiving the adjacent ends of the elongated pipe insulation tubing.

2. A pipe insulation coupling member as set forth in claim 1 wherein said planar interior wall defines a plurality of slits therethrough extending from said center bore to said outer tubular wall to promote separation of said first wedge-shaped section from said second wedge-shaped section and allow said outer tubular wall to resiliently flex between said open and closed positions.

3. A pipe insulation coupling member as set forth in claim 2 wherein said outer tubular wall includes opposing separation tabs disposed alongside and parallel to said perforation for separating said elongated body into said first and second wedge-shaped sections.

4. A pipe insulation coupling member as set forth in claim 3 wherein said plurality of slits is generally L-shaped.

5. A pipe insulation coupling member for retaining adjacent ends of elongated pipe insulation tubing around a pipe, said pipe insulation coupling member comprising:
an integrally molded, one piece elongated body extending along a longitudinal axis between a first end and a second end, said elongated body including a cylindrical outer tube wall extending between said first and second ends, and a planar interior wall fixedly secured to said cylindrical outer tube wall generally midway between said first and second ends and extending inwardly from said cylindrical outer tube wall transverse to said longitudinal axis, said planar interior wall including a center bore for receiving the pipe therethrough and a plurality of generally L-shaped slits extending therethrough, wherein said planar interior wall defines opposing first and second outer channels extending from said planar interior wall to said respective one of said first and second ends for receiving the adjacent ends of the elongated pipe insulation tubing.

6. A pipe insulation coupling member as set forth in claim 5 wherein said outer tube wall includes outwardly protruding tabs.

7. A pipe insulation coupling member as set forth in claim 5 wherein said elongated body includes first and second wedge-shaped sections.

8. A pipe insulation coupling member as set forth in claim 7 wherein said outer tube wall includes a longitudinally extending perforation whereat said first wedge-shaped section is separated from said second wedge-shaped section and wherein said coupling member is resiliently flexed from a closed position for surrounding and supporting the pipe to an open position providing a space between said first and second wedge-shaped sections for receiving the pipe therebetween.

9. A pipe insulation coupling member as set forth in claim 8 wherein said outer tube wall includes opposing separation tabs disposed alongside and parallel to said perforation for separating said elongated body into said first and second wedge-shaped sections.

10. A pipe insulation coupling member for retaining adjacent ends of elongated pipe insulation tubing around a pipe, said pipe insulation coupling member comprising:
an integrally molded, one piece elongated body extending along a longitudinal axis between a first end and a second end, said elongated body including an outer tubular wall extending between said first and second ends, said outer tubular wall including a longitudinally extending perforation and opposing separation tabs disposed alongside and parallel to said perforation to allow for separation of said elongated body, and a planar interior wall fixedly secured to said outer tubular wall generally midway between said first and second ends and extending inwardly from said outer tubular wall transverse to said longitudinal axis, said planar interior wall including a center bore for receiving the pipe therethrough and defining opposing first and second outer channels extending from said planar interior wall to said respective one of said first and second ends for receiving the adjacent ends of the elongated pipe insulation tubing.

11. A pipe insulation coupling member as set forth in claim 10 wherein said outer tube wall includes outwardly protruding tabs.

12. A pipe insulation coupling member as set forth in claim 10 wherein said elongated body includes first and second wedge-shaped sections separated from one another at said perforation.

13. A pipe insulation coupling member as set forth in claim 12 wherein said planar interior wall defines a plurality of slits therethrough extending from said center bore to said outer tube wall to promote separation of said first wedge-shaped section from said second wedge-shaped section and allow said outer tube wall to resiliently flex between said open and closed positions.

14. A pipe insulation coupling member as set forth in claim 13 wherein said plurality of slits is generally L-shaped.

15. A pipe insulation coupling member for retaining adjacent ends of elongated pipe insulation tubing around a pipe, said pipe insulation coupling member comprising:

an integrally molded, one piece elongated body extending along a longitudinal axis between a first end and a second end, said elongated body including an outer tubular wall extending between said first and second ends, said outer tubular wall including outwardly protruding tabs generally midway between said first and second ends thereof, and a planar interior wall fixedly secured to said outer tubular wall generally midway between said first and second ends and extending inwardly from said outer tubular wall transverse to said longitudinal axis, said planar interior wall including a center bore for receiving the pipe therethrough and defining opposing first and second outer channels extending from said planar interior wall to said respective one of said first and second ends for receiving the adjacent ends of the elongated pipe insulation tubing, said planar wall having a thickness in the direction of said longitudinal axis and wherein said first and second outer channels have a length in the direction of said longitudinal axis greater than said thickness of said planar interior wall.

* * * * *